LA FAYETTE MYERS & A. A. CARRICK.
POWDERED MOLASSES FOOD AND PROCESS OF PRODUCING THE SAME.
APPLICATION FILED AUG. 5, 1912.
1,065,464.
Patented June 24, 1913.
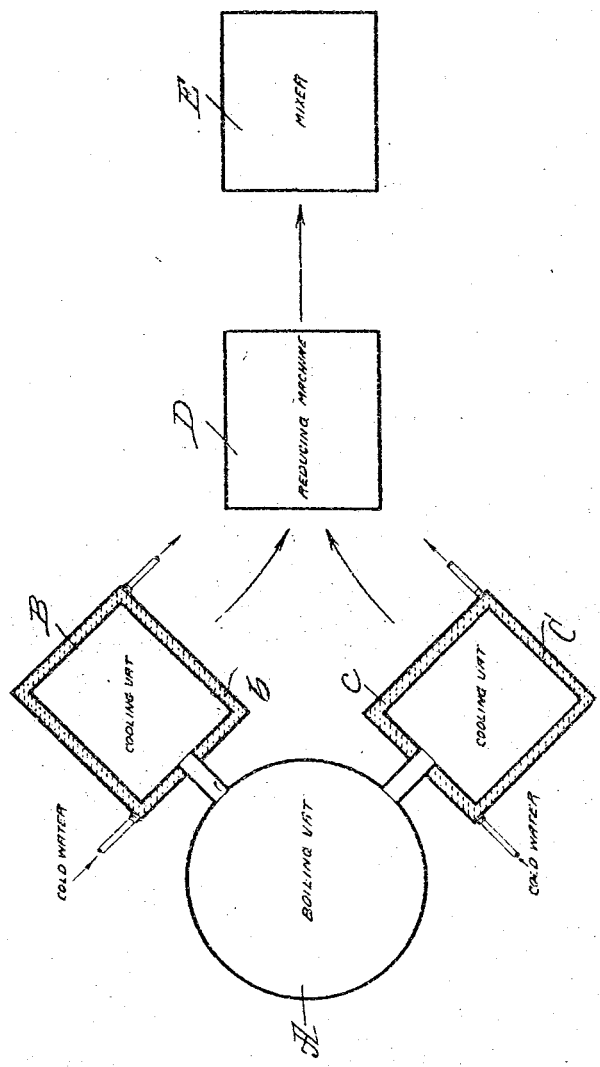

UNITED STATES PATENT OFFICE.

LA FAYETTE MYERS AND ARTHUR A. CARRICK, OF GLENDALE, ARIZONA.

POWDERED-MOLASSES FOOD AND PROCESS OF PRODUCING THE SAME.

1,065,464. Specification of Letters Patent. Patented June 24, 1913.

Application filed August 5, 1912. Serial No. 713,363.

*To all whom it may concern:*

Be it known that we, LA FAYETTE MYERS and ARTHUR A. CARRICK, citizens of the United States, and residents of Glendale, in the county of Maricopa and State of Arizona, have invented a new and useful Improvement in Powdered-Molasses Food and Processes of Producing the Same, of which the following is a specification.

Our invention relates to a process of reducing molasses to a powdered form and consists in the various steps hereinafter specified.

An object of our invention is to provide a powdered molasses and a process for producing the same, which will serve as a suitable food for stock by the addition of water.

A further object of our invention is to provide a process for producing a powdered molasses which may be easily handled and transported and which will keep indefinitely until such a time as it is desired to again bring it to a liquid state by the addition of water to be used in feeding cattle.

Other objects and advantages will appear in the following specification. and the novel features of the invention will be particularly pointed out in the appended claims.

Our invention is illustrated in the accompanying drawing which is a diagrammatic view of a certain apparatus used in the process.

It will be understood that this view is for purposes of illustration only and that any suitable apparatus might be used without departing from the spirit and scope of the invention.

In carrying out our process, we make use of molasses of any kind, as for instance that obtained from beets, cane, sorghum, or corn. This may be either the standard, commercial, or refuse molasses. Neither is it essential that the molasses shall have been obtained by any particular heat, as our process works equally well with molasses obtained by direct heat, steam, electricity, or the steam and vacuum process.

The apparatus, by means of which the liquid molasses is obtained which forms the base from which we obtain the final product, may be either open kettles, vacuum pans, or closed kettles.

In the drawing, A denotes a kettle or pan in which the liquid molasses, which forms the base material from which the final product is made, is boiled. Either before or after the boiling process, sufficient tallow, cottonseed oil, grease, or oil of any other suitable substance necessary to obtain a brittle product is added to the liquid molasses. The entire mass is then boiled down to a density of about 95 degrees Brix. The hot liquid is then conveyed in any suitable manner to vats, such as those shown at B and C the inside of which is coated with tallow, oil, or grease of any other suitable substance that will keep the mass from adhering to the surface of the vat. These vats are artificially cooled, either by water jackets $b$ and $c$ as shown in the drawing, or in any other suitable manner. When the mass has had time to cool, it is taken from the vats B and C and broken up into pieces of small size. Powdered starch is then added to the small pieces for the purpose of taking up all excess moisture. After being treated with the starch, the small pieces are then conveyed to a reducing machine D and there ground, rolled, or milled so as to get the mass into a powdered or ground form. From thence, the mass is conveyed to a mixer, such as that shown at E and is thoroughly mixed. During this mixing, sufficient starch is added to keep the product in a dry condition. This product is then packed in boxes, barrels, or cartons and is ready for the market.

By the process described, a superior stock food is produced which may be kept indefinitely, which is easy to transport, and which may be readily made into a liquid condition for feeding cattle or other stock by the mere addition of water.

We claim:—

1. The herein described food product which consists of a dry powdered molasses food having a molasses base mixed with an oleaginous substance which congeals at ordinary temperatures, and powdered starch.

2. The herein described food product which consists of a dry powder having as a base molasses mixed with a grease which congeals at ordinary temperatures, and powdered starch.

3. The herein described process for producing powdered molasses food, which consists in adding to liquid molasses an oleaginous substance which congeals at ordinary temperatures boiling the mixture, cooling the boiled mixture, breaking the cooled mixture up into small particles, adding a moisture absorbing agent, and subsequently reducing the mixture to a finely divided state.

4. The herein described process for producing powdered molasses food which consists in adding to liquid molasses a grease which congeals at ordinary temperatures, boiling the mixture, cooling the boiled mixture so as to congeal the mass, breaking the congealed mass up into small particles, adding starch and subsequently reducing the mixture to a finely divided state.

LA FAYETTE MYERS.
ARTHUR A. CARRICK.

Witnesses:
CHAS. A. COHENOUR,
J. W. ROBINSON.